(12) United States Patent
Chen et al.

(10) Patent No.: US 7,073,830 B1
(45) Date of Patent: Jul. 11, 2006

(54) PORTABLE BUMPER PROTECTOR

(76) Inventors: Jian Chen, 150-13 26th Ave., Flushing, NY (US) 11354; Dennis Q. Chen, 150-13 26th Ave., Flushing, NY (US) 11354

( * ) Notice: Subject to any disclaimer, the term of this patent is extended or adjusted under 35 U.S.C. 154(b) by 0 days.

(21) Appl. No.: 11/258,303

(22) Filed: Oct. 25, 2005

(51) Int. Cl.
*B60R 19/44* (2006.01)

(52) U.S. Cl. .................. 293/142; 293/109; 293/126

(58) Field of Classification Search ............... 293/108, 293/109, 126, 128, 142; 267/136, 139; 280/220; 296/39.1
See application file for complete search history.

(56) References Cited

U.S. PATENT DOCUMENTS

| | | | |
|---|---|---|---|
| 3,574,379 A | 4/1971 | Jordan | |
| 3,610,669 A | 10/1971 | Morrissey, Sr. | |
| 3,610,684 A | 10/1971 | Richter | |
| 3,897,095 A | 7/1975 | Glance | |
| 4,561,685 A | 12/1985 | Fischer | |
| 4,643,471 A | 2/1987 | Fishback | |
| 4,810,013 A * | 3/1989 | Spears | 293/128 |
| 5,071,181 A * | 12/1991 | Wagner | 293/128 |
| 5,618,073 A | 4/1997 | Criscione | |
| 5,975,599 A * | 11/1999 | Goldstein | 293/128 |
| 6,186,564 B1 * | 2/2001 | Ashcroft | 293/128 |
| 6,247,734 B1 * | 6/2001 | Hamilton et al. | 293/128 |
| 6,572,086 B1 | 6/2003 | Kelly | |
| 6,572,163 B1 | 6/2003 | Pickett | |
| D479,821 S | 9/2003 | Clarkson | |
| 6,637,790 B1 | 10/2003 | Bio | |
| D508,222 S | 8/2005 | Tekavec | |
| 2003/0038497 A1 * | 2/2003 | Fitzgerald | 296/39.1 |

* cited by examiner

*Primary Examiner*—Jason Morrow
(74) *Attorney, Agent, or Firm*—Randal D. Homburg

(57) ABSTRACT

A bumper protection device for automobile bumpers to shield the bumpers from impact attaches to the automobile by a fabric shroud which attaches around the hood and trunk latch and suspends an impact resisting padded guard portion, adapted to the vehicle bumper, covering the entire front or rear bumper, the padded guard portion being drawn partially around the sides of the bumper and anchored by at least one elastic strap attached to opposing ends of the bumper guard portion, each elastic strap being further attached to the tires or wheel wells of the automobile retaining the bumper protection device over the entire rear bumper surface and around the sides of the bumper.

2 Claims, 2 Drawing Sheets

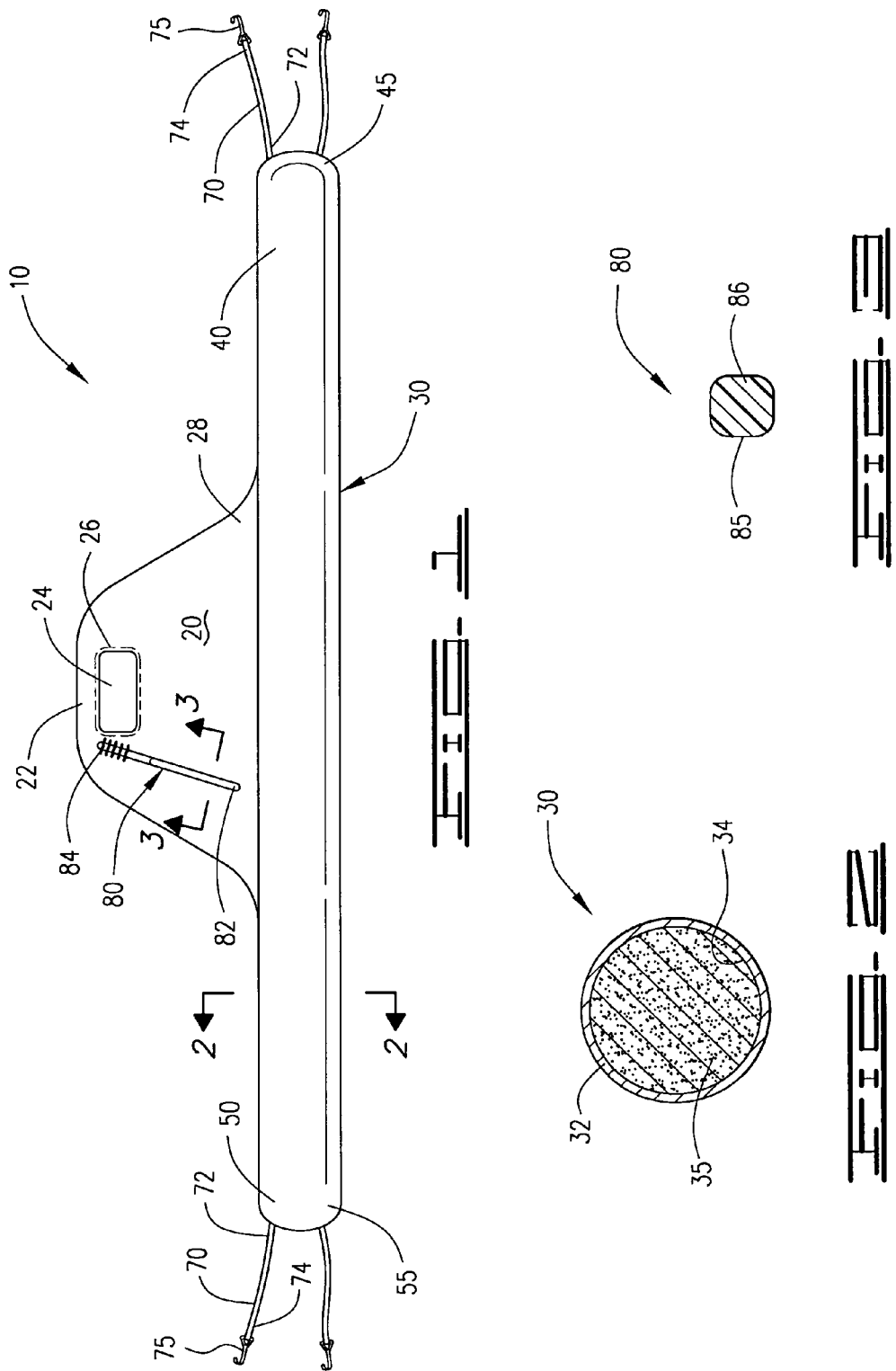

PORTABLE BUMPER PROTECTOR

CROSS REFERENCE TO RELATED APPLICATIONS

None

I. BACKGROUND OF THE INVENTION

1. Field of Invention

A bumper protection device for automobile bumpers to shield the bumpers from impact attaches to the automobile by a fabric shroud which attaches around the hood and trunk latch and suspends an impact resisting padded guard portion, adapted to the vehicle bumper, covering the entire front or rear bumper, the padded guard portion being drawn partially around the sides of the bumper and anchored by at least one elastic strap attached to opposing ends of the bumper guard portion, each elastic strap being further attached to the tires or wheel wells of the automobile retaining the bumper protection device over the entire rear bumper surface and around the sides of the bumper.

2. Description of Prior Art

The following United States patents were discovered and are disclosed within this application for utility patent. All relate to vehicle bumper and side impact protectors.

Two U.S. Pat. No. 3,574,379 to Jordan and U.S. Pat. No. 3,897,095 to Glance deal with bumper protectors incorporated directly as part of the bumper of a vehicle, which have either a liquid foam filling of a collapsible elastic material contained in a cavity, with the devices attached to the front of the bumper to absorb impact.

Several side impact protection devices are disclosed in the prior art, including U.S. Pat. No. 4,643,471 to Fishback, U.S. Pat. No. 4,561,685 to Fisher, U.S. Pat. No. 3,610,684 to Richter and U.S. Pat. No. 3,610,669 to Morrissey, Sr. All these prior art patent include a protective panel suspended by connectors and attached to door handles, a clip or hook attached to the roof of the vehicle, captured between the door and the vehicle roof, or simply draped across the hood and trunk with two protectors, one on each side of the vehicle.

In yet another set of prior art patents, front or rear bumper guards are attached to either the front bumper or the rear bumper. U.S. Pat. No. 5,618,073 to Criscione discloses a rear bumper protector which covers the rear bumper and attaches to the bumper using straps looped through attachment handles located within the wheel wells. A hook inside the trunk secures flexible strips of material having variable distances holes attached to a portable cushion protector over a bumper with magnetic strips holding the sides of the protector to the side of the vehicle in U.S. Pat. No. 6,572,086 to Kelly. In U.S. Pat. No. 6,572,163 to Pickett, a bumper guard has a visual deterrent in the form of metal spike protruding from a base, with the device being suspended from the vehicle by a plastic anchor attached to a vehicle by two straps. Hooks attach straps suspending a deformable material, the hooks attaching to something inside the trunk with the trunk lid closed on top of the straps in U.S. Pat. No. 6,637,790 to Bio. An ornamental design for a bumper guard having apparent straps attached to the floor of the vehicle, shown as a van, in U.S. Design Pat. No. D508,222 to Tevavec.

Although similar in function and purpose, the above noted patents do not demonsrate or disclose a bumper protector having a fabric apron with an upper portion having a reinforced aperture adapted to be placed around a trunk or hood latch with a flexible engagement handle and a lower portion forming a linear cavity within which is placed a deformable padding material, the lower portion covering a vehicle bumper and having a flexible joint allowing the lower portion to extend around the sides of the bumper, the lower portion further having opposing ends to which are attached at least on elastic cord having a hook on its end which attaches the elastic cord to the edge of nearest wheel well, stretching the lower portion across the bumper and closely contouring the lower portion to the rear bumper of the vehicle.

II. SUMMARY OF THE INVENTION

In large cities where parking on the street is limited and available parking spaces are a premium, parking can literally be bumper to bumper. On older street which are narrow, most parking is in the form of parallel parking. This requires driving skill, which often many drivers lack. A parking vehicle striking the bumper of another parked vehicle in the front bumper or the rear bumper is a common occurrence, as identified in significant prior art. Additionally, finding the driver of the vehicle which struck the parked vehicle's bumper can be difficult, especially in very large cities, requiring the owner of the damaged vehicle to pay for their own cost of repair. Protecting the front and rear bumper of a parked car from cosmetic or structural damage is also obvious from the significant prior art, especially in today's time, when costs of repairs to damaged bumpers can be extremely costly and time consuming. Therefore, a quickly attaching portable bumper would be desired by drivers who don't want to risk the cost and expense of having their bumpers damaged while they are parked and away from their vehicles.

The primary objective of the portable bumper protection device provides the device attaching to the vehicle covering the entire bumper that requires no permanent modification to the vehicle, attaches quickly without risk of injury to the vehicle owner, and when applied would conform to the contour of the vehicle bumper protecting the bumper from cosmetic and structural damage from minor impact. A second objective would provide the protector in a collapsible embodiment to be stored within the vehicle during operation. A third objective is to provide the device to adapt to either the front bumper of a vehicle, the rear bumper of a vehicle, or to both bumpers.

III. DESCRIPTION OF THE DRAWINGS

The following drawings are submitted with this utility patent application.

FIG. 1 is a front view of the bumper protection device.

FIG. 2 is a cross-sectional view of the bumper guard section along reference lines 2/2 of FIG. 1.

FIG. 3 is a cross-sectional view of the placement handle along reference lines 3/3 of FIG. 1.

IV. DESCRIPTION OF THE PREFERRED EMBODIMENT

Figures 4, 5:
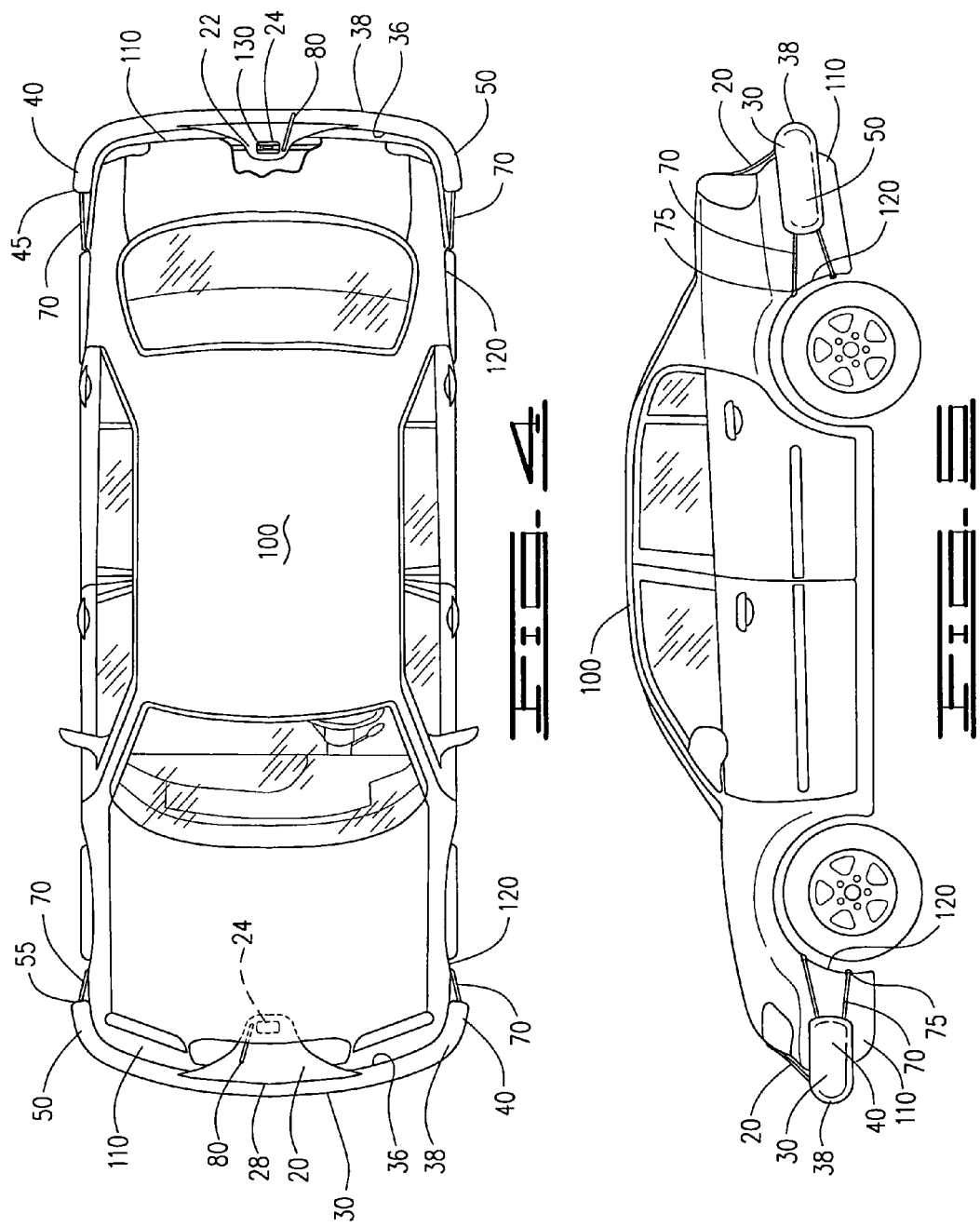
FIG. 4 is a top view of an automobile with a bumper protection device on both the front and rear bumper with the elastic cords attached to the wheel wells of the vehicle and the suspensory aperture of the bumper protection device engaged with the latch mechanism in the rear of the vehicle with a cut-away section of the trunk exposing the latch mechanism.
FIG. 5 is a side view of the vehicle with a bumper protection device attached to the front and rear portion of the vehicle.

A portable automobile bumper protection device 10, as shown in FIGS. 1–5 of the drawings, providing protection to an entire front or rear bumper 110 of a vehicle 100 while parked, comprises a fabric apron 20 having an upper portion 22 having a semi-flexible placement handle 80 and a suspensory aperture 24 with a reinforced margin 26, the suspensory aperture 24 adapted to be placed over a trunk or hood latch mechanism 130, the apron 20 further defining a lower portion 28 which is attached to a bumper guard section 30 defining a flexible cylindrical sleeve 32 forming an inner cavity 34 and having an inner surface 36 and an outer surface 38, the inner cavity 34 filled with a deformable padding material 35, FIG. 2, the cylindrical sleeve 32 having a right end 40 with a right end tab 45 and a left end 50 with a left end tab 55, each right and left end tab 45, 55 attaching to a first end 72 of at least one elastic cord 70, the cord 70 having a second end 74 with a hook 75, wherein the device 10 attaches to the vehicle 100 by placing the suspensory aperture 24 over the hood or trunk latch mechanism 130, closing the hood or trunk over the upper portion 22 of the fabric apron 20 after the bumper guard section 30 is positioned over the vehicle bumper 110, and attaching the hook 75 of each elastic cord 70 to a wheel or a nearest adjacent wheel well 120 of the vehicle 100, conforming the bumper guard section 30 to the front or rear bumper 110, protection the front or rear bumper 110 from minor impact while parked.

The fabric apron 20 would preferably be made from a sturdy nylon material, canvas, or other suitable fabric which would resist tears and compression forces from minor impact. The suspensory aperture 24 and the reinforced margin 26 would conform in shape to a lower latch component of the hood or trunk latch mechanism 130, which in most cases would be a rectangle. The lower latch components would extend up and through the suspensory aperture 24 and should not impede the engagement of the lower latch component and upper latch component of the trunk or hood, FIGS. 4–5. The reinforced margin 26 may be reinforced by implanting piping along the reinforced margin or may be accomplished by adding stitching. It is important that this reinforced margin 26 not easily tear, since during a minor impact this margin may be subjected to some degree of force which would tend to displace the bumper guard section 30 from the vehicle bumper 110.

The semi-flexible placement handle 80 has a grip end 82 and an attaching end 84 which is permanently or removably attached to the upper portion 22 near the suspensory apeture 24. It would be preferred that the semi-flexible placement handle 80 be made of the same fabric material as the apron 20, formed as a hollow tube 85, with a semi-deformable filling material 86, FIG. 3, allowing the semi-flexible placement handle 80 to be held on the grip end 82 to retain the upper portion 22 and the suspensory aperture 24 within the hood or trunk area around the hood or trunk latch mechanism 130 and shut the hood or trunk without the risk of closing the trunk or lid on the hand holding the grip end 82, and compressing the semi-flexible placement handle 80 while not interrupting the closure of the hood or trunk.

The right end 40 with the right end tab 45 and the left end 50 with the left end tab 55 may be constituted by the same material and by simply attaching the inner surface 36 and outer surface 38 together, FIGS. 1 and 4–5. The first end 72 of the elastic cord 70 may either be sewn onto the end tabs 45, 55 or an optional eyelet may be included in each end tab with the first end 72 of the elastic cord 70 being tied or otherwise affixed to the eyelet The hook 80 on the second end 74 of each elastic cord 70 should be adapted to engage the wheel well 120 or the wheel of the tire of the vehicle. The deformable padding material 35 would preferably be a foam rubber material that would be compressible yet return to a pre-compression shape after compression, FIG. 2.

The fabric apron 22 and the bumper guard section 30 with the deformable padding material 35 would need to have sufficient flexibility to be folded for compact storage, preferably by rolling the fabric apron 20, preferably triangular shape as shown in the drawings, around the bumper guard section 30 and then folding the rolled device twice to reduce the length of the device for storage in the vehicle trunk until applied to the vehicle when parked. One single size embodiment should be adapted to a specific vehicle, and perhaps to a front or rear bumper 110 on that specific vehicle 100, since it is unlikely that all vehicles have the same distance between the trunk or hood latch mechanism 130 and the bumper 110.

While the invention has been particularly shown and described with reference to a preferred embodiment thereof, it will be understood by those skilled in the art that changes in form and detail may be made therein without departing from the spirit and scope of the invention.

What is claimed is:

1. A portable automobile bumper protection device attaching to a hood or truck latch and a wheel well or wheel of a vehicle, providing protection to a front or rear bumper of a vehicle from minor impact when parked, comprises:
   a fabric apron having a lower portion and an upper portion defining a suspensory aperture with a reinforced margin, the suspensory aperture adapted to be placed over a trunk or hood latch mechanism of a vehicle trunk or hood; and
   a bumper guard section attached to said lower portion, said bumper guard section defining a flexible cylindrical sleeve forming having an inner surface, an outer surface and defining an inner cavity containing a deformable padding material, said cylindrical sleeve further defining a right end with a right end tab and a left end with a left end tab, at least one elastic cord having a first end attaching to each said right end tab and left end tab and a second end having a hook, wherein said reinforced margin of said suspensory aperture is attached around said latch, positioning said inner surface of said bumper guard section upon said vehicle bumper below said latch, further attaching said hook of each said elastic cord to said adjacent wheel well or wheel conforming said bumper guard section to said bumper, said outer surface and said deformable padding material providing protection to said bumper from minor impact.

2. The device as disclosed in claim 1, further comprising:
   a semi-flexible placement handle having a grip end and an attaching end attached to said upper portion near said suspensory aperture, said handle forming a hollow tube containing a semi-deformable filling material, allowing said semi-flexible placement handle to be held on said grip end retaining said upper portion and said reinforced aperture upon said latch during closure of a hood or trunk of said vehicle upon said upper portion without risk of injury, said semi-flexible placement handle compressing to avoid impediment to said closure of said hood or trunk.

* * * * *